(12) United States Patent
Lin

(10) Patent No.: US 8,038,131 B1
(45) Date of Patent: Oct. 18, 2011

(54) AIR-CUSHION TYPE SHOCK-ABSORBING DEVICE FOR A WHEELED VEHICLE

(75) Inventor: Cheng-Hsiung Lin, Changhua Hsien (TW)

(73) Assignee: Pin Hsiu Rubber Co., Ltd., Changhua Hsien (TW)

( * ) Notice: Subject to any disclaimer, the term of this patent is extended or adjusted under 35 U.S.C. 154(b) by 455 days.

(21) Appl. No.: 12/210,329

(22) Filed: Sep. 15, 2008

(51) Int. Cl.
*F16F 9/04* (2006.01)
(52) U.S. Cl. ...................................... 267/64.27; 267/122
(58) Field of Classification Search .............. 267/64.21, 267/64.24, 64.27, 64.28, 122
See application file for complete search history.

(56) References Cited

U.S. PATENT DOCUMENTS

| 5,649,692 A * | 7/1997 | Gilsdorf et al. ............ 267/64.21 |
| 6,286,820 B1 * | 9/2001 | Raulf et al. ................. 267/64.21 |
| 6,607,186 B2 * | 8/2003 | Voelkel ....................... 267/64.27 |

* cited by examiner

*Primary Examiner* — Christopher Schwartz
(74) *Attorney, Agent, or Firm* — Alan Kamrath; Kamrath & Associates PA

(57) ABSTRACT

A shock-absorbing device includes a shock-absorbing cylinder, an air cell mounted on the shock-absorbing cylinder, an upper seal cover mounted on an upper end of the air cell and having a side provided with a mounting portion mounted on the shock-absorbing cylinder, and a lower seal cover mounted on a lower end of the air cell and having a side provided with a mounting section mounted on the shock-absorbing cylinder. Thus, the mounting portion of the upper seal cover and the mounting section of the lower seal cover are directly mounted on the shock-absorbing cylinder, so that the upper seal cover and the lower seal cover are directly mounted on the shock-absorbing cylinder easily and quickly to assemble the shock-absorbing device without needing aid of any screw or other hand tool.

19 Claims, 7 Drawing Sheets

AIR-CUSHION TYPE SHOCK-ABSORBING DEVICE FOR A WHEELED VEHICLE

BACKGROUND OF THE INVENTION

1. Field of the Invention

The present invention relates to a shock-absorbing device and, more particularly, to an air-cushion type shock-absorbing device for a wheeled vehicle, such as a car and the like.

2. Description of the Related Art

A conventional shock-absorbing device for a wheeled vehicle in accordance with the prior art shown in FIGS. 5 and 6 comprises a shock-absorbing cylinder 50, an air cell 51 mounted on the shock-absorbing cylinder 50, two seal covers 55 mounted on two ends of the air cell 51, and two clamping rings 52 pressing the two ends of the air cell 51 and combined with the two seal covers 55. Each of the two ends of the air cell 51 is provided with a hooking flange 511, and each of the two clamping rings 52 is provided with a lip 521 hooked on the respective hooking flange 511 of the air cell 51. The two clamping rings 52 are combined with the two seal covers 55 by a plurality of screws 54. In operation, when the shock-absorbing device is mounted on a car, the two seal covers 55 and the shock-absorbing cylinder 50 are mounted between the car body and the wheels of the car. Thus, when the car is subjected to a larger shock or vibration, the shock-absorbing cylinder 50 is retracted inwardly or extended outwardly, and the air cell 51 is compressed or expanded so as to buffer the shock or vibration, thereby providing a shock-absorbing effect to the car. However, the screws 54 are easily loosened during a long-term utilization, so that the air contained in the air cell 51 easily leaks outwardly from the gap between the two clamping rings 52 and the two seal covers 55.

Another conventional shock-absorbing device for a wheeled vehicle in accordance with the prior art shown in FIG. 7 comprises a shock-absorbing cylinder 60, an air cell 61 mounted on the shock-absorbing cylinder 60, two seal covers 62 mounted on two ends of the air cell 61, and two mounting seats 63 combined with the two seal covers 62 and mounted on the shock-absorbing cylinder 60. The two seal covers 62 are mounted on the shock-absorbing cylinder 60 by the two mounting seats 63. The two mounting seats 63 are combined with the two seal covers 62 by a plurality of screws 65. In operation, when the shock-absorbing device is mounted on a car, the two mounting seats 63 and the shock-absorbing cylinder 60 are mounted between the car body and the wheels of the car. Thus, when the car is subjected to a larger shock or vibration, the shock-absorbing cylinder 60 is retracted inwardly or extended outwardly, and the air cell 61 is compressed or expanded so as to buffer the shock or vibration, thereby providing a shock-absorbing effect to the car. However, it is necessary to make the two mounting seats 63 additionally, thereby greatly increasing the costs of fabrication. In addition, some of the screws 65 are extended into the air cell 61 and are easily loosened during a long-term utilization, so that the air contained in the air cell 51 easily leaks outwardly from the lower one of the two seal covers 62 and the lower one of the two mounting seats 63.

BRIEF SUMMARY OF THE INVENTION

In accordance with the present invention, there is provided a shock-absorbing device, comprising a shock-absorbing cylinder, an air cell mounted on the shock-absorbing cylinder, an upper seal cover mounted on an upper end of the air cell and having a side provided with a protruding mounting portion mounted on an upper end of the shock-absorbing cylinder, and a lower seal cover mounted on a lower end of the air cell and having a side provided with a protruding mounting section mounted on a lower end of the shock-absorbing cylinder.

The primary objective of the present invention is to provide a shock-absorbing device having an air-tight effect.

Another objective of the present invention is to provide a shock-absorbing device, wherein the mounting portion of the upper seal cover and the mounting section of the lower seal cover are directly mounted on the shock-absorbing cylinder, so that the upper seal cover and the lower seal cover are directly mounted on the shock-absorbing cylinder easily and quickly to assemble the shock-absorbing device without needing aid of any screw or other hand tool, thereby facilitating assembly of the shock-absorbing device, and thereby decreasing the costs of fabrication and assembly of the shock-absorbing device.

A further objective of the present invention is to provide a shock-absorbing device, wherein the upper seal cover has a periphery provided with a bent upper locking hook hooked onto the upper retaining flange of the air cell, and the lower seal cover has a periphery provided with a bent lower locking hook hooked onto the lower retaining flange of the air cell, so that the upper seal cover and the lower seal cover are combined with the air cell closely to prevent the air contained in the air cell from leaking outwardly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
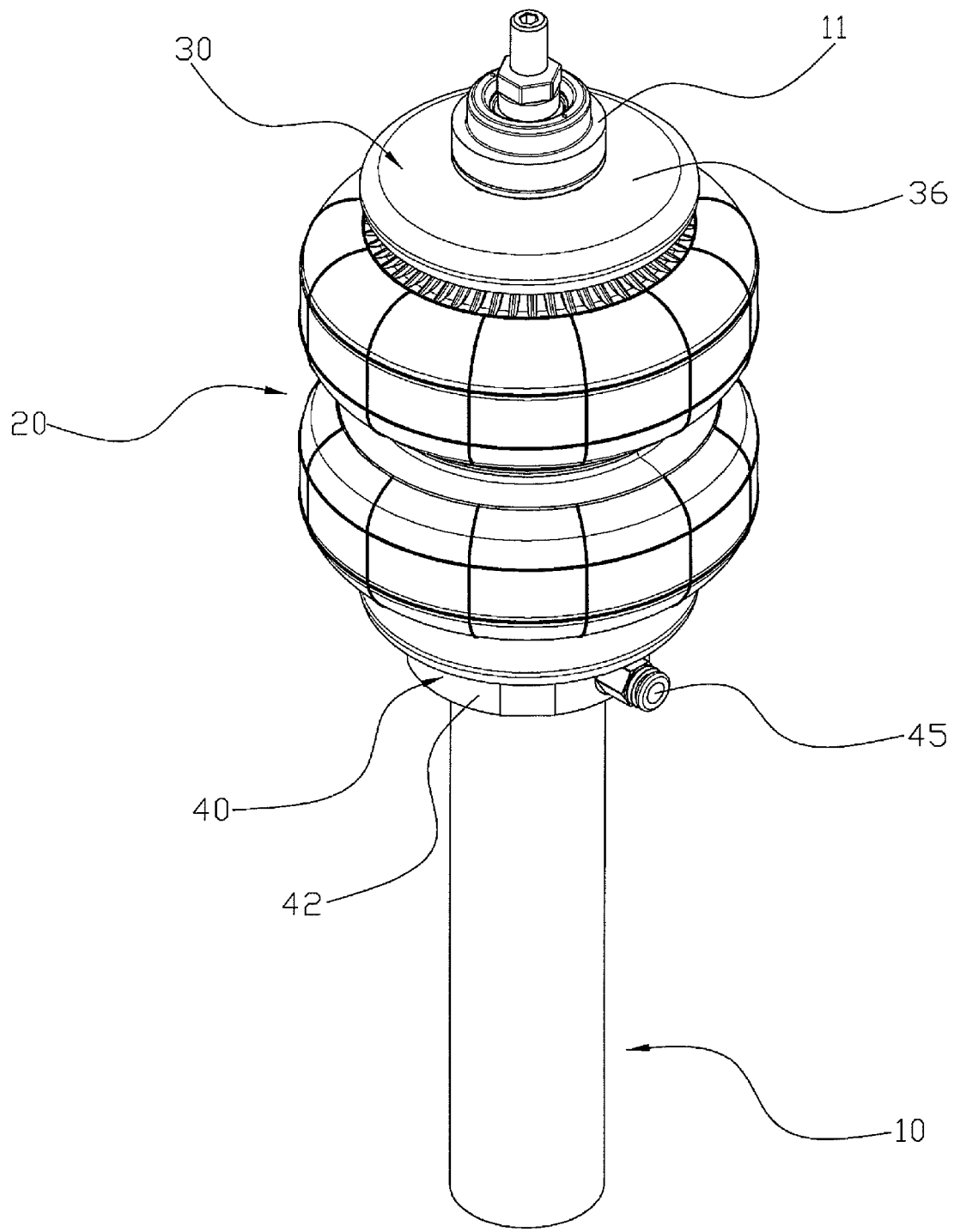
FIG. 1 is a perspective view of a shock-absorbing device in accordance with the preferred embodiment of the present invention.
Figure 2:
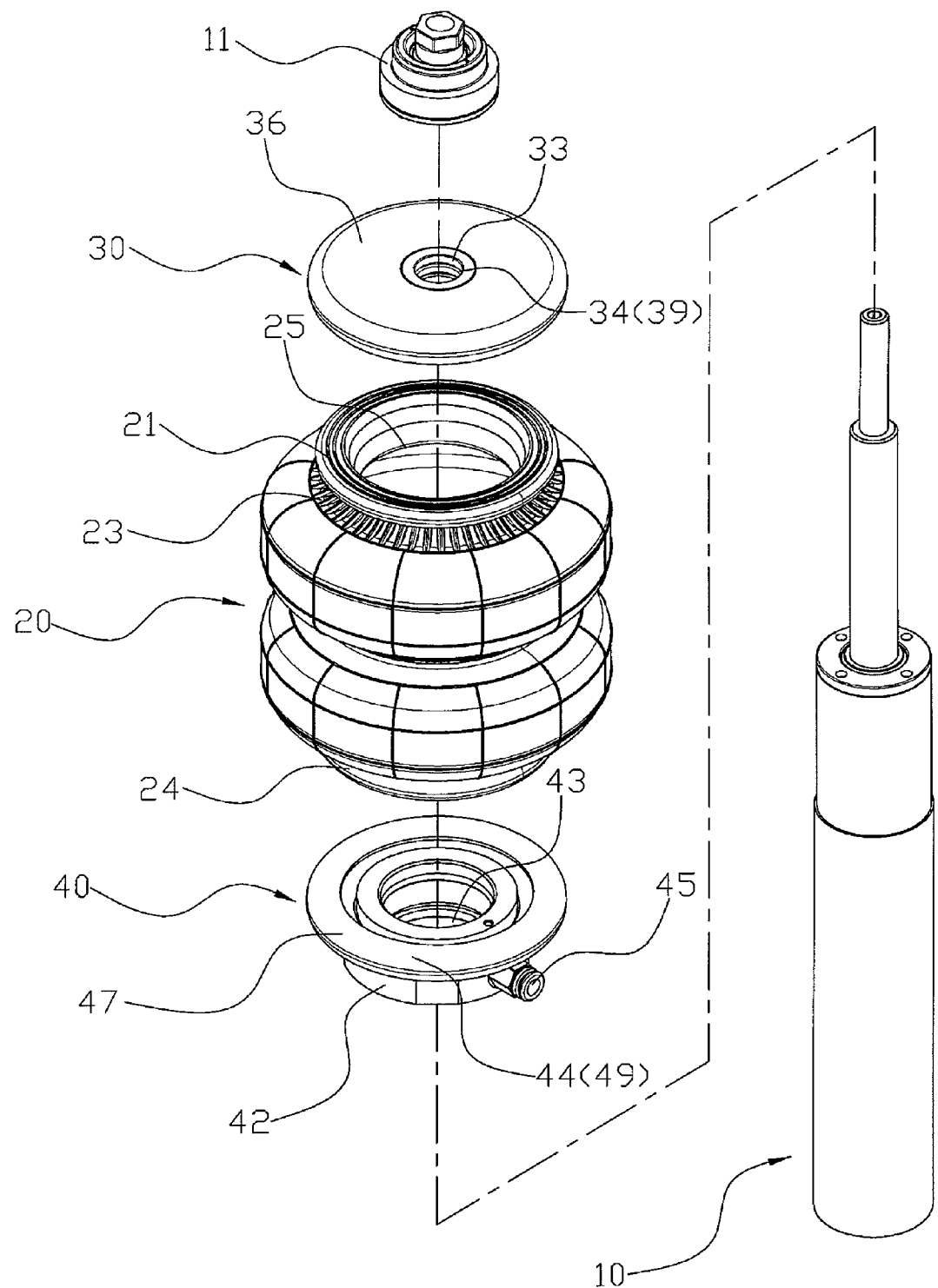
FIG. 2 is an exploded perspective view of the shock-absorbing device as shown in FIG. 1.
Figure 3:
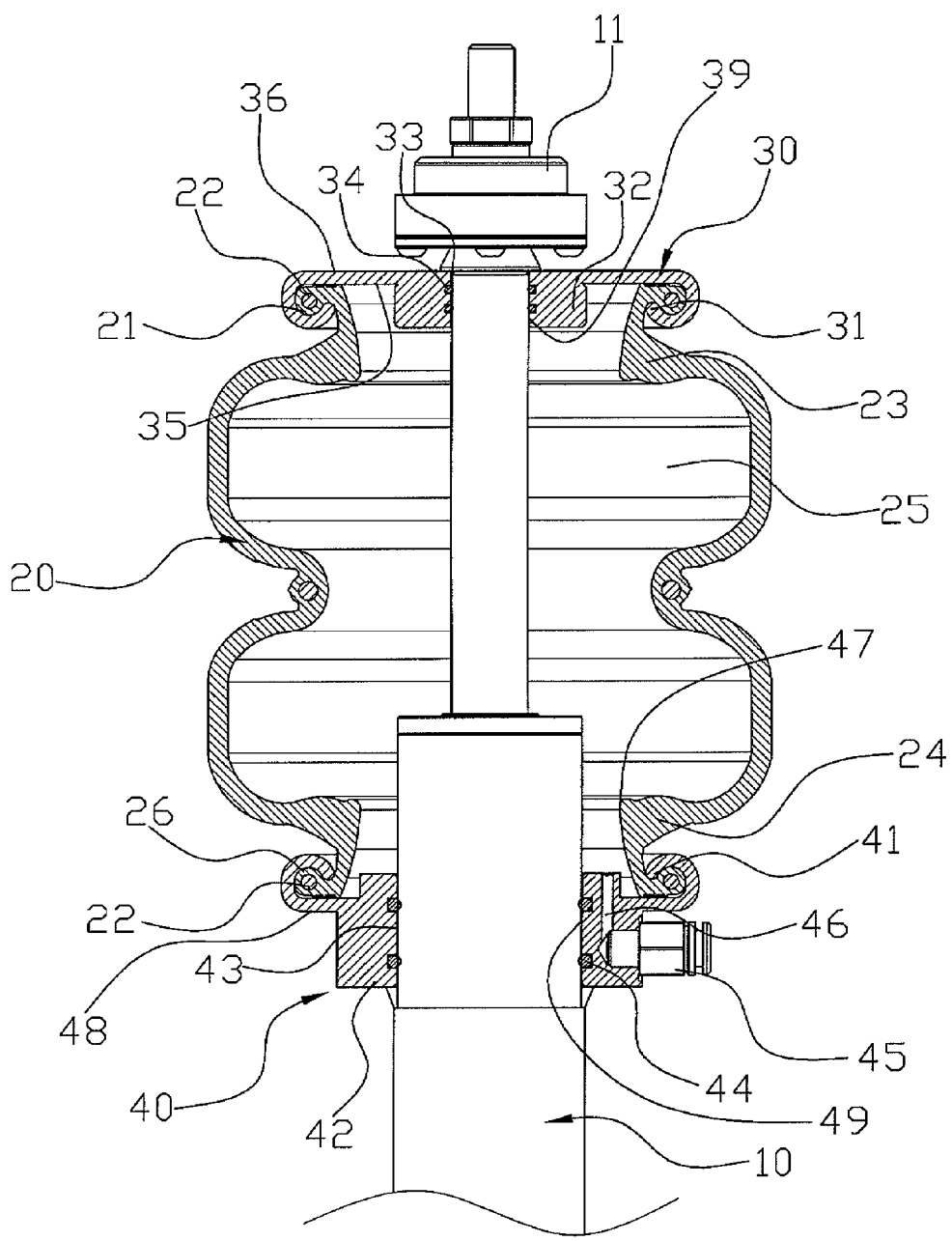
FIG. 3 is a front cross-sectional view of the shock-absorbing device as shown in FIG. 1.

Referring to the drawings and initially to FIGS. 1-3, a shock-absorbing device for a wheeled vehicle in accordance with the preferred embodiment of the present invention comprises a telescopically arranged shock-absorbing cylinder 10, an air cell 20 mounted on the shock-absorbing cylinder 10, an upper seal cover 30 mounted on an upper end 23 of the air cell 20 and having a side provided with a protruding mounting portion 32 mounted on an upper end of the shock-absorbing cylinder 10, a fastening member 11 mounted on the upper end of the shock-absorbing cylinder 10 and located above the upper seal cover 30 to prevent detachment of the upper seal cover 30 from the shock-absorbing cylinder 10, and a lower seal cover 40 mounted on a lower end 24 of the air cell 20 and having a side provided with a protruding mounting section 42 mounted on a lower end of the shock-absorbing cylinder 10.

The air cell 20 is made of rubber and has an inside provided with a receiving chamber 25. The upper end 23 of the air cell 20 has a periphery provided with a radially and outwardly extending upper retaining flange 21, and the lower end 24 of the air cell 20 has a periphery provided with a radially and outwardly extending lower retaining flange 26. Each of the upper retaining flange 21 and the lower retaining flange 26 of the air cell 20 has an inside provided with a metallic wire 22 to reinforcing the strength of each of the upper retaining flange 21 and the lower retaining flange 26 of the air cell 20.

The upper seal cover 30 has a periphery provided with a downward and inward extending bent upper locking hook 31 hooked onto the upper retaining flange 21 of the air cell 20. The upper seal cover 30 has an inner face 35 directed toward the air cell 20 and an outer face 36 located opposite to the inner face 35. The mounting portion 32 of the upper seal cover 30 is integrally formed on the upper seal cover 30 and located at a central portion of the upper seal cover 30. The mounting portion 32 of the upper seal cover 30 protrudes outwardly from the inner face 35 of the upper seal cover 30 and extends into the receiving chamber 25 of the air cell 20. The mounting portion 32 of the upper seal cover 30 has an inner wall provided with a mounting hole 33 mounted on the upper end of the shock-absorbing cylinder 10. The mounting hole 33 of the mounting portion 32 of the upper seal cover 30 is located at a central portion of the mounting portion 32 of the upper seal cover 30 and extends through a whole thickness of the mounting portion 32 of the upper seal cover 30. The mounting hole 33 of the mounting portion 32 of the upper seal cover 30 has a peripheral wall provided with at least one retaining groove 39 to receive at least one upper O-ring 34 which is located between the upper end of the shock-absorbing cylinder 10 and the mounting portion 32 of the upper seal cover 30.

The lower seal cover 40 has a periphery provided with an upward and inward extending bent lower locking hook 41 hooked onto the lower retaining flange 26 of the air cell 20. The lower seal cover 40 has an inner face 47 directed toward the air cell 20 and an outer face 48 located opposite to the inner face 47. The mounting section 42 of the lower seal cover 40 is integrally formed on the lower seal cover 40 and located at a central portion of the lower seal cover 40. The mounting section 42 of the lower seal cover 40 protrudes outwardly from the outer face 48 of the lower seal cover 40 and extends outwardly from the air cell 20. The mounting section 42 of the lower seal cover 40 has an inner wall provided with a mounting bore 43 mounted on the lower end of the shock-absorbing cylinder 10. The mounting bore 43 of the mounting section 42 of the lower seal cover 40 is located at a central portion of the mounting section 42 of the lower seal cover 40 and extends through a whole thickness of the mounting section 42 of the lower seal cover 40. The mounting bore 43 of the mounting section 42 of the lower seal cover 40 has a peripheral wall provided with at least one retaining slot 49 to receive at least one lower O-ring 44 which is located between the lower end of the shock-absorbing cylinder 10 and the mounting section 42 of the lower seal cover 40. The mounting section 42 of the lower seal cover 40 has an outer wall provided with an inflation nozzle 45 and has a side provided with a flow channel 46 connected between the inflation nozzle 45 and the receiving chamber 25 of the air cell 20. Thus, the air cell 20 is inflated and deflated by the inflation nozzle 45 of the lower seal cover 40 to fit wheeled vehicles of different heights.

Figure 4:
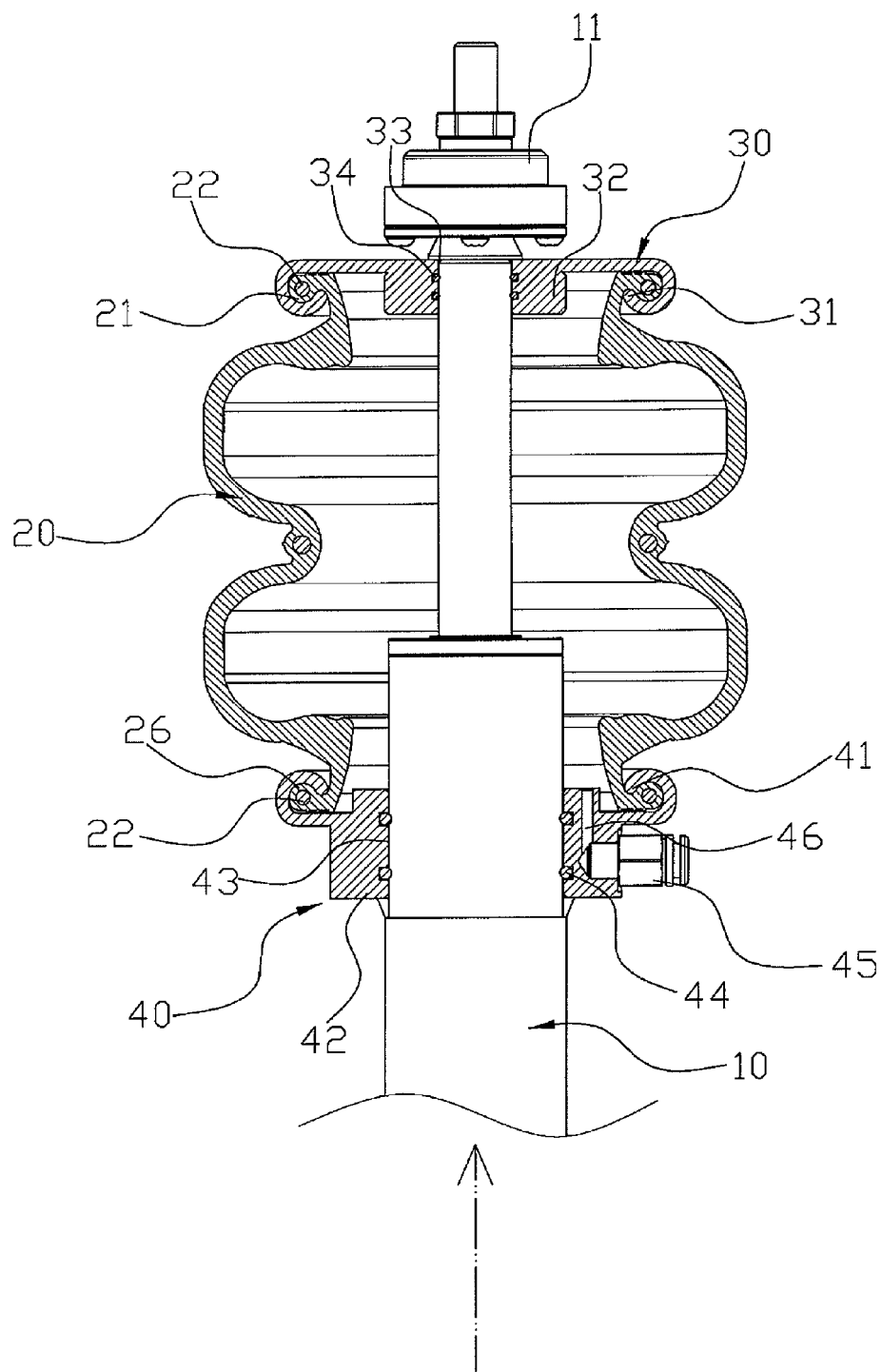
FIG. 4 is a schematic operational view of the shock-absorbing device as shown in FIG. 3 in use.
Figure 5:
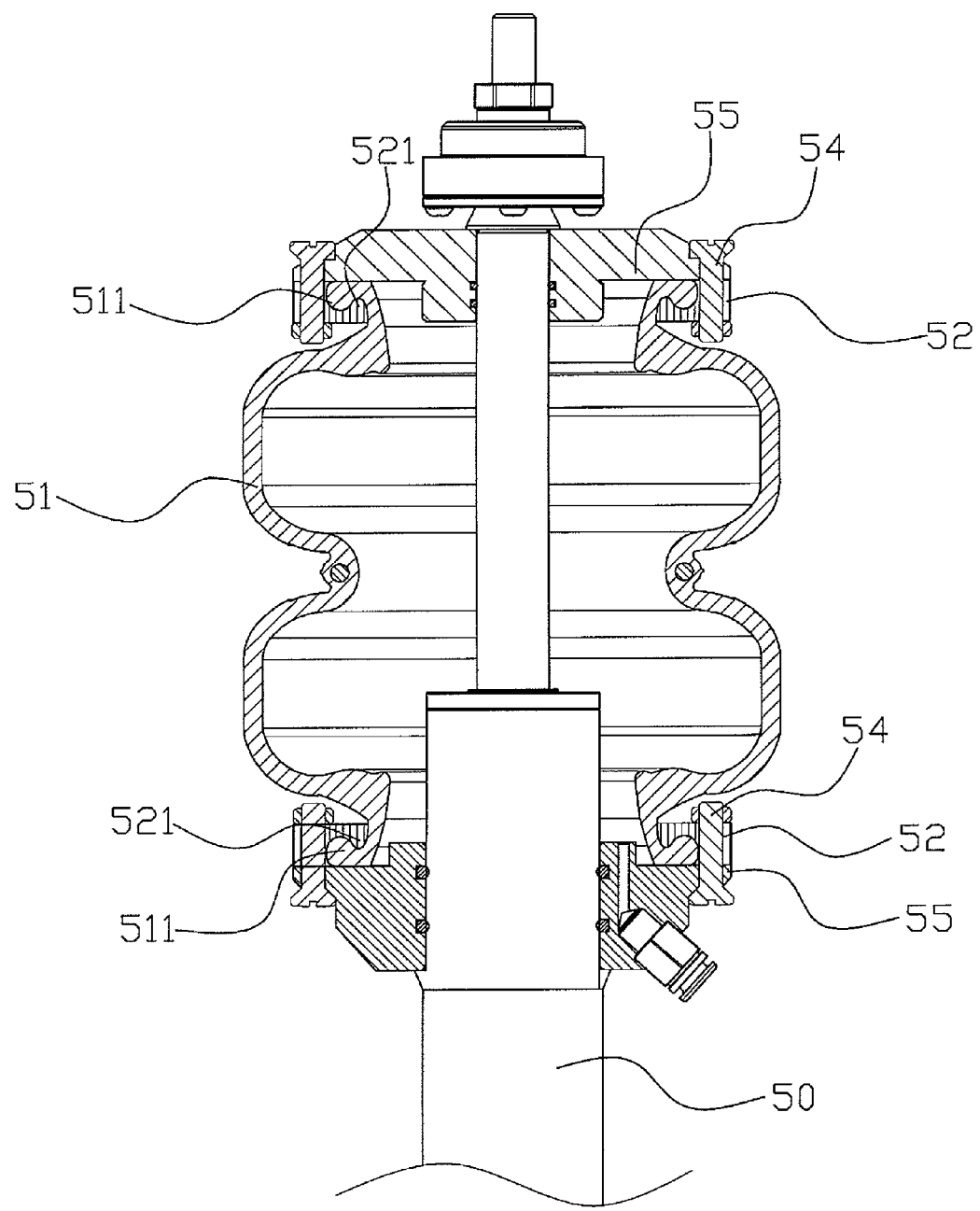
FIG. 5 is a front cross-sectional assembly view of a conventional shock-absorbing device in accordance with the prior art.
Figure 6:
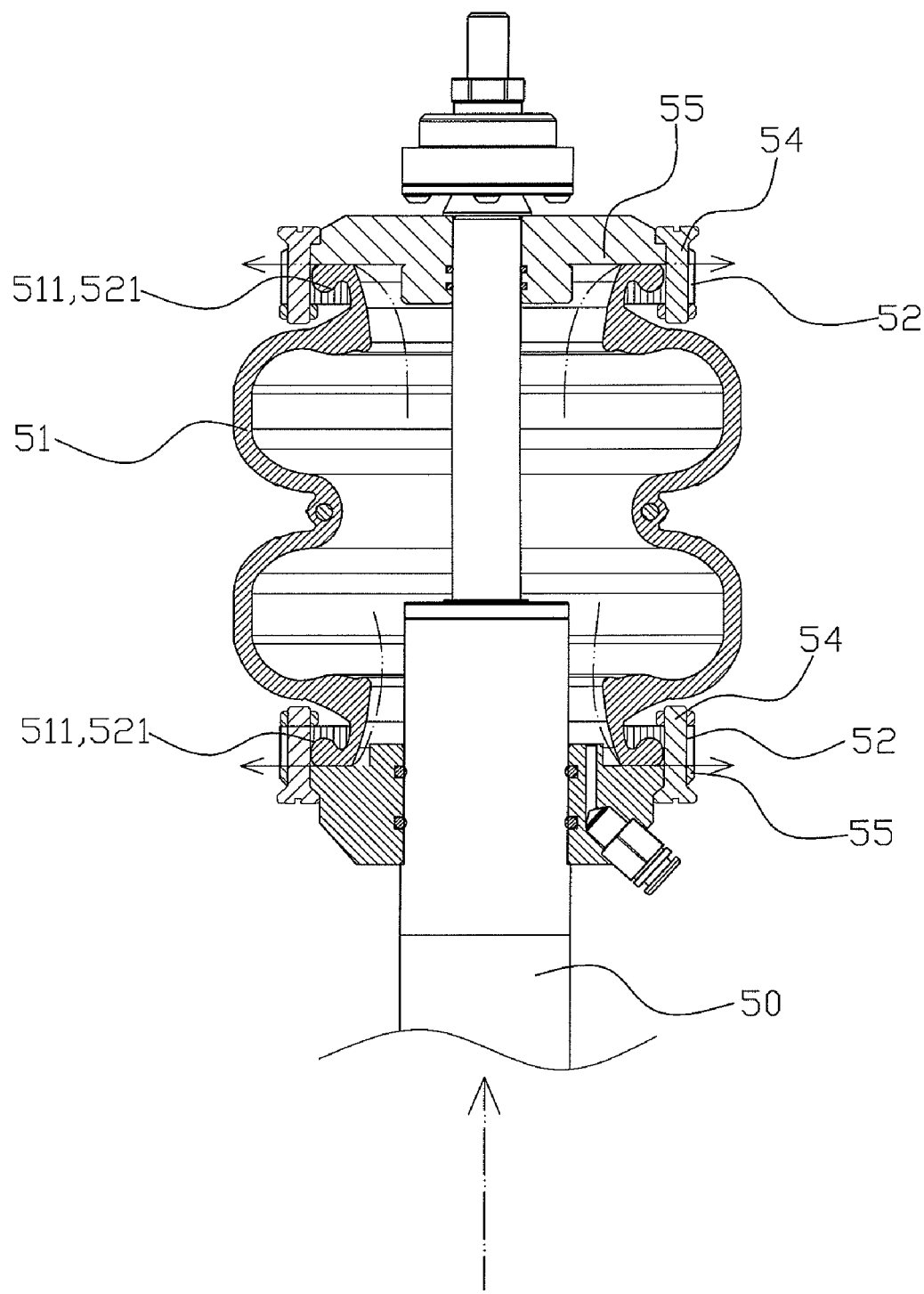
FIG. 6 is a schematic operational view of the conventional shock-absorbing device as shown in FIG. 5 in use.
Figure 7:
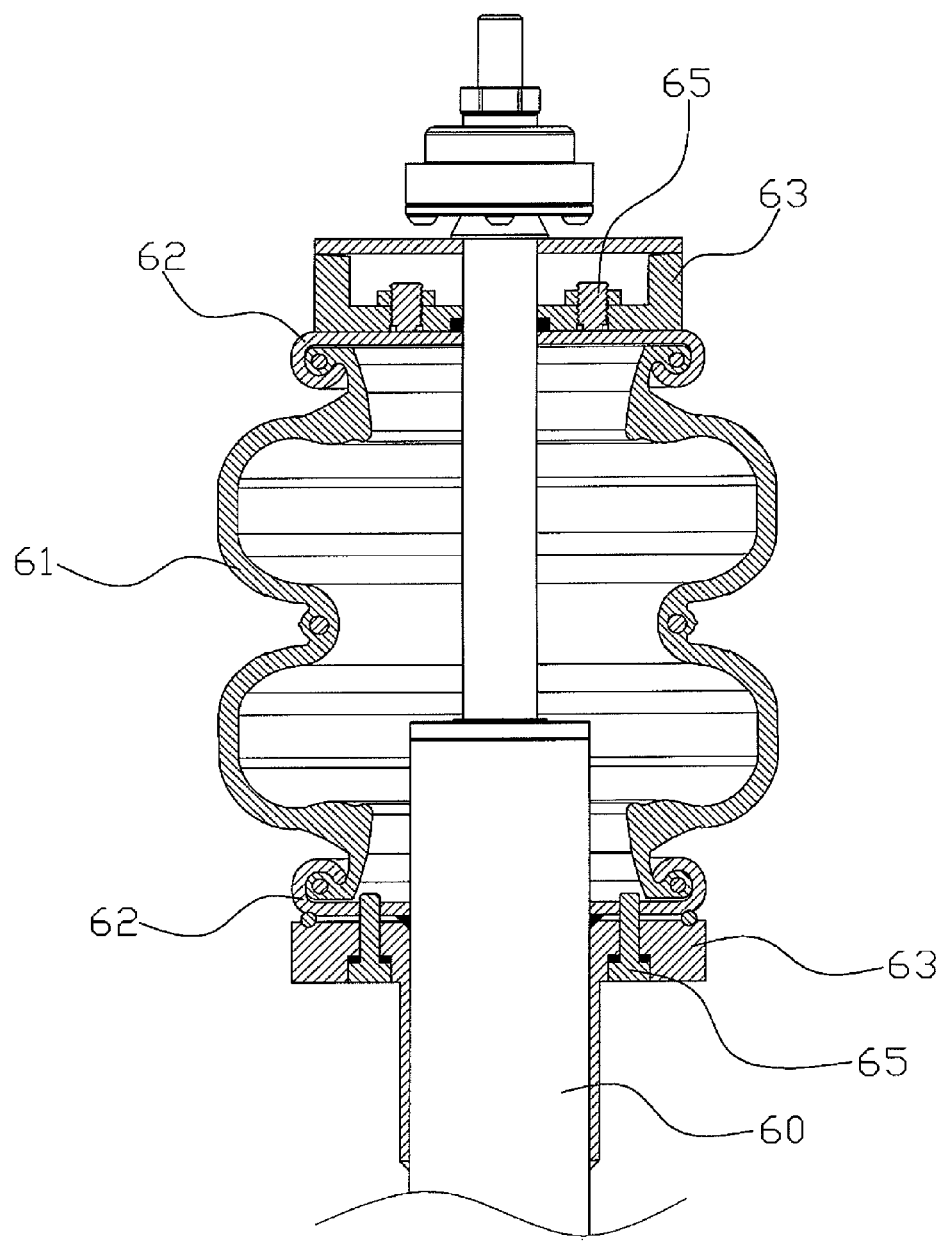
FIG. 7 is a front cross-sectional assembly view of another conventional shock-absorbing device in accordance with the prior art.

In operation, referring to FIG. 4 with reference to FIGS. 1-3, when the shock-absorbing device is mounted on a car, the upper seal cover 30 and the lower seal cover 40 are mounted between the car body and the wheels of the car. Thus, when the car is subjected to a larger shock or vibration during travel on a rugged road, the shock-absorbing cylinder 10 is retracted inwardly or extended outwardly, and the air cell 20 is compressed or expanded so as to buffer the shock or vibration, thereby providing a shock-absorbing effect to the car.

Accordingly, the mounting portion 32 of the upper seal cover 30 and the mounting section 42 of the lower seal cover 40 are directly mounted on the shock-absorbing cylinder 10, so that the upper seal cover 30 and the lower seal cover 40 are directly mounted on the shock-absorbing cylinder 10 easily and quickly to assemble the shock-absorbing device without needing aid of any screw or other hand tool, thereby facilitating assembly of the shock-absorbing device, and thereby decreasing the costs of fabrication and assembly of the shock-absorbing device. In addition, the upper seal cover 30 has a periphery provided with a bent upper locking hook 31 hooked onto the upper retaining flange 21 of the air cell 20, and the lower seal cover 40 has a periphery provided with a bent lower locking hook 41 hooked onto the lower retaining flange 26 of the air cell 20, so that the upper seal cover 30 and the lower seal cover 40 are combined with the air cell 20 closely to prevent the air contained in the air cell 20 from leaking outwardly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A shock-absorbing device, comprising:
a shock-absorbing cylinder;
an air cell mounted on the shock-absorbing cylinder;
an upper seal cover mounted on an upper end of the air cell and having a side provided with a protruding mounting portion mounted on an upper end of the shock-absorbing cylinder;
a lower seal cover mounted on a lower end of the air cell and having a side provided with a protruding mounting section mounted on a lower end of the shock-absorbing cylinder;
wherein the upper end of the air cell has a periphery provided with a radially and outwardly extending upper retaining flange;
the lower end of the air cell has a periphery provided with a radially and outwardly extending lower retaining flange;
the upper seal cover has a periphery provided with a downward and inward extending bent upper locking hook which is directly hooked onto the upper retaining flange of the air cell so that the upper seal cover is directly mounted on the upper end of the air cell without needing any screw;
the lower seal cover has a periphery provided with an upward and inward extending bent lower locking hook which is directly hooked onto the lower retaining flange of the air cell so that the lower seal cover is directly mounted on the lower end of the air cell without needing any screw.

2. The shock-absorbing device of claim 1, wherein the mounting portion of the upper seal cover has an inner wall provided with a mounting hole mounted on the upper end of the shock-absorbing cylinder.

3. The shock-absorbing device of claim 2, wherein the mounting hole of the mounting portion of the upper seal cover is located at a central portion of the mounting portion of the upper seal cover.

4. The shock-absorbing device of claim 2, wherein the mounting hole of the mounting portion of the upper seal cover extends through a whole thickness of the mounting portion of the upper seal cover.

5. The shock-absorbing device of claim 2, wherein the mounting hole of the mounting portion of the upper seal cover has a peripheral wall provided with at least one retaining groove to receive at least one upper O-ring which is located between the upper end of the shock-absorbing cylinder and the mounting portion of the upper seal cover.

6. The shock-absorbing device of claim 1, wherein the mounting section of the lower seal cover has an inner wall provided with a mounting bore mounted on the lower end of the shock-absorbing cylinder.

7. The shock-absorbing device of claim 6, wherein the mounting bore of the mounting section of the lower seal cover is located at a central portion of the mounting section of the lower seal cover.

8. The shock-absorbing device of claim 6, wherein the mounting bore of the mounting section of the lower seal cover extends through a whole thickness of the mounting section of the lower seal cover.

9. The shock-absorbing device of claim 6, wherein the mounting bore of the mounting section of the lower seal cover has a peripheral wall provided with at least one retaining slot to receive at least one lower O-ring which is located between the lower end of the shock-absorbing cylinder and the mounting section of the lower seal cover.

10. The shock-absorbing device of claim 1, wherein
the upper seal cover has an inner face directed toward the air cell and an outer face located opposite to the inner face;
the mounting portion of the upper seal cover protrudes outwardly from the inner face of the upper seal cover.

11. The shock-absorbing device of claim 10, wherein
the air cell has an inside provided with a receiving chamber;
the mounting portion of the upper seal cover extends into the receiving chamber of the air cell.

12. The shock-absorbing device of claim 1, wherein the mounting portion of the upper seal cover is integrally formed on the upper seal cover.

13. The shock-absorbing device of claim 1, wherein the mounting portion of the upper seal cover is located at a central portion of the upper seal cover.

14. The shock-absorbing device of claim 1, wherein
the lower seal cover has an inner face directed toward the air cell and an outer face located opposite to the inner face;
the mounting section of the lower seal cover protrudes outwardly from the outer face of the lower seal cover and extends outwardly from the air cell.

15. The shock-absorbing device of claim 1, wherein the mounting section of the lower seal cover is integrally formed on the lower seal cover.

16. The shock-absorbing device of claim 1, wherein the mounting section of the lower seal cover is located at a central portion of the lower seal cover.

17. The shock-absorbing device of claim 1, wherein
the air cell has an inside provided with a receiving chamber;
the mounting section of the lower seal cover has an outer wall provided with an inflation nozzle and has a side provided with a flow channel connected between the inflation nozzle and the receiving chamber of the air cell.

18. The shock-absorbing device of claim 1, wherein the upper retaining flange of the air cell has an inside provided with a metallic wire.

19. The shock-absorbing device of claim 1, wherein the lower retaining flange of the air cell has an inside provided with a metallic wire.

\* \* \* \* \*